(12) United States Patent
Valiani

(10) Patent No.: US 10,252,932 B2
(45) Date of Patent: Apr. 9, 2019

(54) DEVICE FOR CUTTING PLATES

(71) Applicant: Franco Valiani, Castelfiorentino (IT)

(72) Inventor: Franco Valiani, Castelfiorentino (IT)

( * ) Notice: Subject to any disclaimer, the term of this patent is extended or adjusted under 35 U.S.C. 154(b) by 0 days.

(21) Appl. No.: 15/518,850

(22) PCT Filed: Oct. 1, 2015

(86) PCT No.: PCT/IB2015/057521
§ 371 (c)(1),
(2) Date: Apr. 13, 2017

(87) PCT Pub. No.: WO2016/087959
PCT Pub. Date: Jun. 9, 2016

(65) Prior Publication Data
US 2017/0305779 A1    Oct. 26, 2017

(30) Foreign Application Priority Data
Dec. 6, 2014   (CN) .................... 2014 2 0766166 U

(51) Int. Cl.
*C03B 33/027* (2006.01)
*B26D 1/16* (2006.01)
*B26D 5/00* (2006.01)
*B26D 5/02* (2006.01)
*C03B 33/10* (2006.01)

(52) U.S. Cl.
CPC .............. *C03B 33/027* (2013.01); *B26D 1/16* (2013.01); *B26D 5/00* (2013.01); *B26D 5/02* (2013.01); *C03B 33/10* (2013.01)

(58) Field of Classification Search
CPC ....... C03B 33/00; C03B 33/02; C03B 33/027; C03B 33/10; C03B 33/105; C03B 33/12; C03B 33/14
USPC .................................................... 83/879, 881
See application file for complete search history.

(56) References Cited

U.S. PATENT DOCUMENTS

| 3,820,677 A | 6/1974 | Garcia |
| 4,098,155 A | 7/1978 | Insolio |
| 4,187,755 A * | 2/1980 | Shirai .................. C03B 33/027 83/487 |
| 4,383,460 A * | 5/1983 | Schotter ................ C03B 33/10 30/164.95 |
| 4,784,030 A * | 11/1988 | Waring .................. B26D 1/24 83/105 |

(Continued)

FOREIGN PATENT DOCUMENTS

| CN | 103241934 | 8/2013 |
| EP | 0009407 | 4/1980 |
| EP | 1983538 | 3/2008 |

*Primary Examiner* — Jason Daniel Prone
*Assistant Examiner* — Richard D Crosby, Jr.
(74) *Attorney, Agent, or Firm* — Themis Law

(57) ABSTRACT

A device for cutting a plate of a pre-determined thickness, preferably a glass plate, includes a frame; a support device for a cutting utensil, which is connected to the frame and adapted to have and upward and downward movement; and a hinged lever system, which has a feeler element and is kinematically coupable with the support device to bind it in a pre-determined initial position with respect to the frame. When the feeler element is pressed against a surface, the hinged lever system causes the support device with the cutting utensil to move downward from an initial position.

6 Claims, 8 Drawing Sheets

(56) References Cited

U.S. PATENT DOCUMENTS

| | | | | |
|---|---|---|---|---|
| 4,965,733 A * | 10/1990 | Kimura | .................. | B29D 30/46 |
| | | | | 700/167 |
| 5,327,353 A * | 7/1994 | Nagano | .................. | B29D 30/46 |
| | | | | 700/167 |
| 6,269,994 B1 * | 8/2001 | Harrington | ............ | B28D 1/225 |
| | | | | 125/23.02 |
| 8,006,599 B2 * | 8/2011 | Nishio | ................... | B28D 1/225 |
| | | | | 225/103 |
| 8,196,793 B2 * | 6/2012 | Ohmura | .................. | B26F 3/002 |
| | | | | 225/103 |
| 8,403,340 B2 * | 3/2013 | Valiani | ............... | B23Q 3/15553 |
| | | | | 279/128 |
| 8,677,871 B2 * | 3/2014 | Van Laar | ................. | B26D 1/16 |
| | | | | 156/406.4 |

\* cited by examiner

DEVICE FOR CUTTING PLATES

TECHNICAL FIELD

The present invention refers to the technical field relative to the machineries for cutting plates, preferably glass plates.

In particular, the invention refers to an innovative device for cutting plates in such a way as to preserve the cutting blade as much as possible.

BACKGROUND ART

Instruments for cutting glass have long been known.

Generally, a support plane is foreseen on which the plate to cut is fixed. FIG. 1A shows such a support in accordance with the known art.

The support foresees a vertical arm forming a binary on which the cutting device slides from bottom to top and vice-versa.

Such a vertical arm is fixed to a horizontal arm and some oblique transverses connect the vertical arm to the horizontal arm in such a way as to form as a whole a support plane for the plate to cut. The vertical arm, which constitutes the sliding binary for the cutting device, creates a space between it and the oblique transverses in such a way that a plate can be positioned under it in the pre-chosen position.

The cutting device foresees a blade holder provided with a fixed cutting blade or a rotatable roller. Such a device is made to slide along the vertical binary until intercepting the plate to cut in such a way that, once the plate is intercepted, it continues its course passing through the plate, cutting it into two parts.

In accordance with this well-known technology, plates can be cut with thicknesses that measure in the order of some millimeters, for example from two to five millimeters.

In principle, for greater thicknesses are used different cutting machineries.

The cutting device is adjusted at such a height that the blade, during the sliding, intercepts the edge of the plate against which it hits to continue with the cut.

Having said that, a technical problem linked to the use of such cutting devices is that such a hit of the blade against the edge of the plate, or sharp edge, causes with time an early breakage of the blade itself, which has to be thus substituted frequently. Further, such hits can bring micro-fractures of the blade thread (of the cutting part of the blade) with an irregular wear. This is the cause, with time, of a quick loss of cutting capacity with the consequent need for a frequent substitution of the blade.

DISCLOSURE OF INVENTION

It is therefore the aim of the present invention to provide a new technology of device for cutting plates that solves at least in part said technical inconveniences.

In particular, it is the aim of the present invention to provide a device for cutting plates in which the cutting part results to be preserved as much as possible, therefore lengthening significantly the duration in time thereof.

These and other aims are therefore reached with a device 1, as described hereinafter.

Such a device (1) for cutting a plate (70) of a pre-determined thickness, preferably a glass plate, foresees:

A frame (10, 31);
A support device (12, 20) for a cutting utensil;
The support device (12, 20) being connected to the frame (10, 31).

In accordance with the invention, the support device (12, 20) is mobile according to an extraction/retraction motion with respect to the frame (10). Further, a hinged lever system (32, 33, 34) is further foreseen having a feeler element (50). The hinged lever system is kinematically couplable with the support device (12, 20) in such a way as to bind it in a pre-determined initial position with respect to the frame and so that, when said feeler element is pressed against a surface (70), for example the surface to cut, an operation of the hinged lever system is determined which conducts the support device, starting from said initial position, towards a progressive extraction motion.

In that manner, all said technical inconveniences are solved.

In particular, the feeler element, and relative hinged lever system, is exploited to cut the edge of the plate to be cut when the support device that assembles the cutting instrument is still in a lifted starting position. The advancing action of the device 1 generates a force on the feeler element that operates said lever system and, from here, a progressive motion of lowering of the support device and therefore of the blade or roller is generated which will enter in contact for the cut not anymore in correspondence of the sharp edge but, rather, downstream of it.

Further advantages can be deduced from the dependent claims.

BRIEF DESCRIPTION OF DRAWINGS

Further features and advantages of the present device 1, as per the invention, will result to be clearer with the description that follows of some preferred embodiments, made to illustrate but not to limit, with reference to the annexed drawings, wherein.

DESCRIPTION OF SOME PREFERRED EMBODIMENTS

Figure 1A:
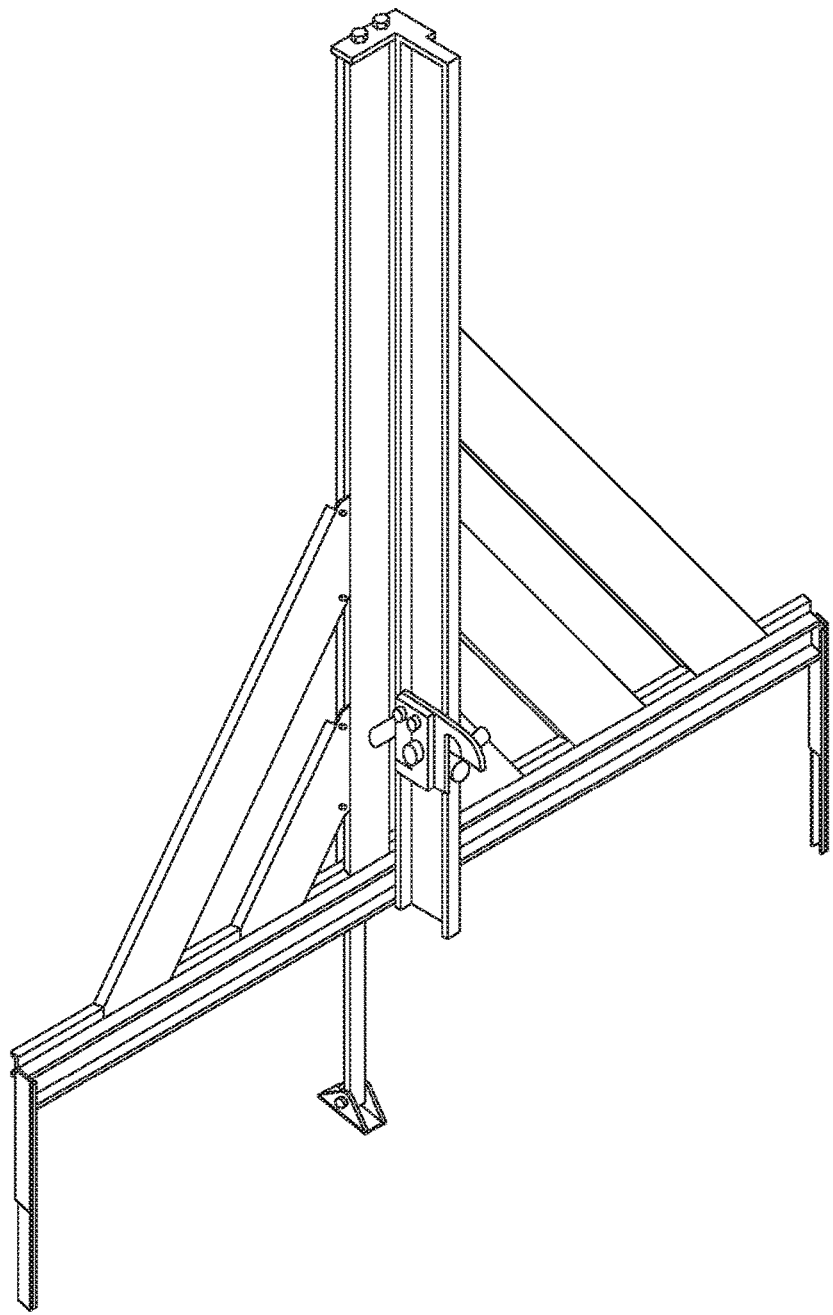
FIG. 1A shows a support frame for a cutting device in accordance with the known art.
Figure 1:
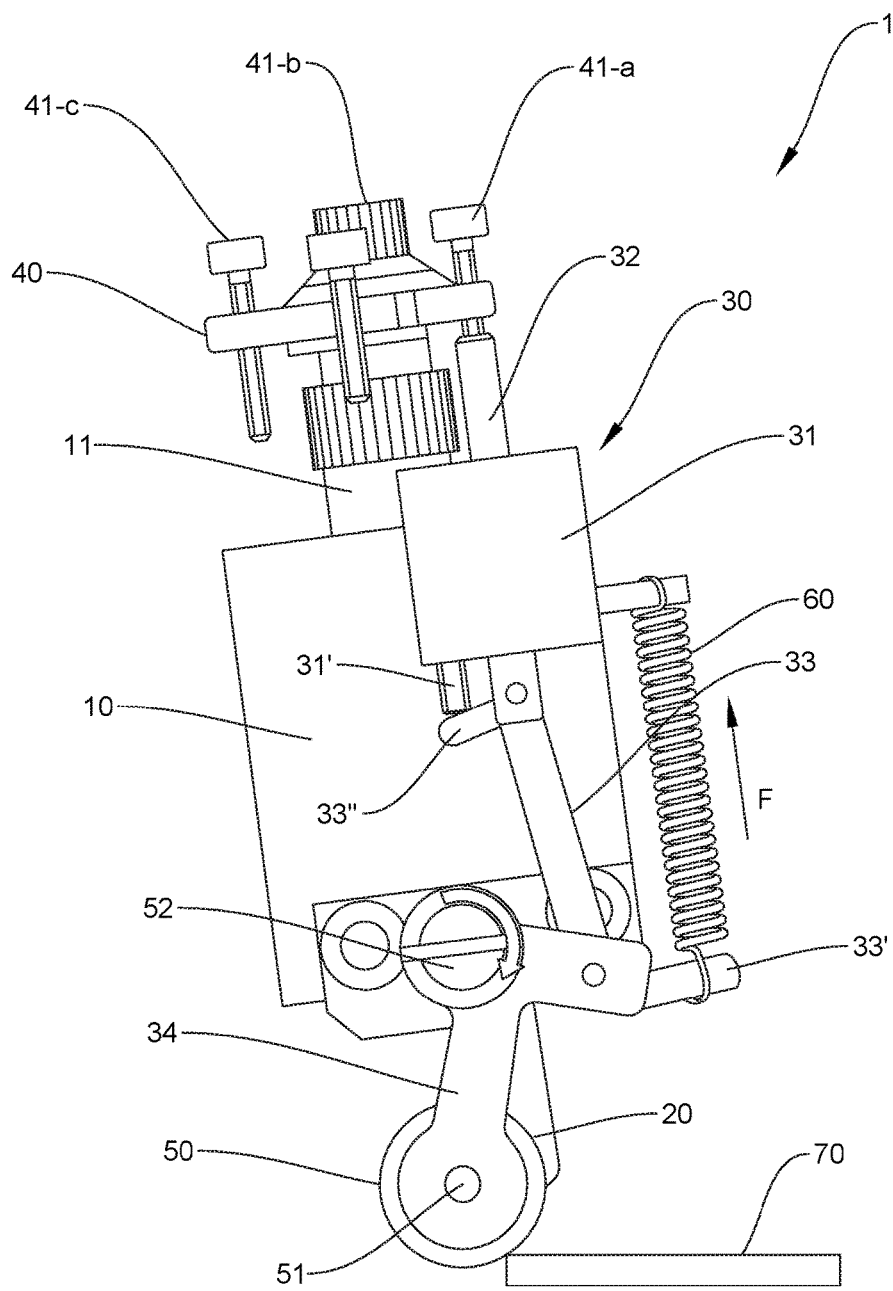
FIGS. 1 to 3 show the device in three different front views in accordance with the present invention.

FIG. 1 shows the device 1 in accordance with the present invention.

The device to cut the glass plates of various thickness foresees a roller 50 which is connected to a hinged lever, as described below, in such a way that the roller, apart from rotating around its fulcrum 51, results to be provided with a lifting/lowering motion.

The roller serves as feeler element.

More in particular, the device 1 foresees a main body 10 with the function of a support frame for the components described below.

Figure 2:
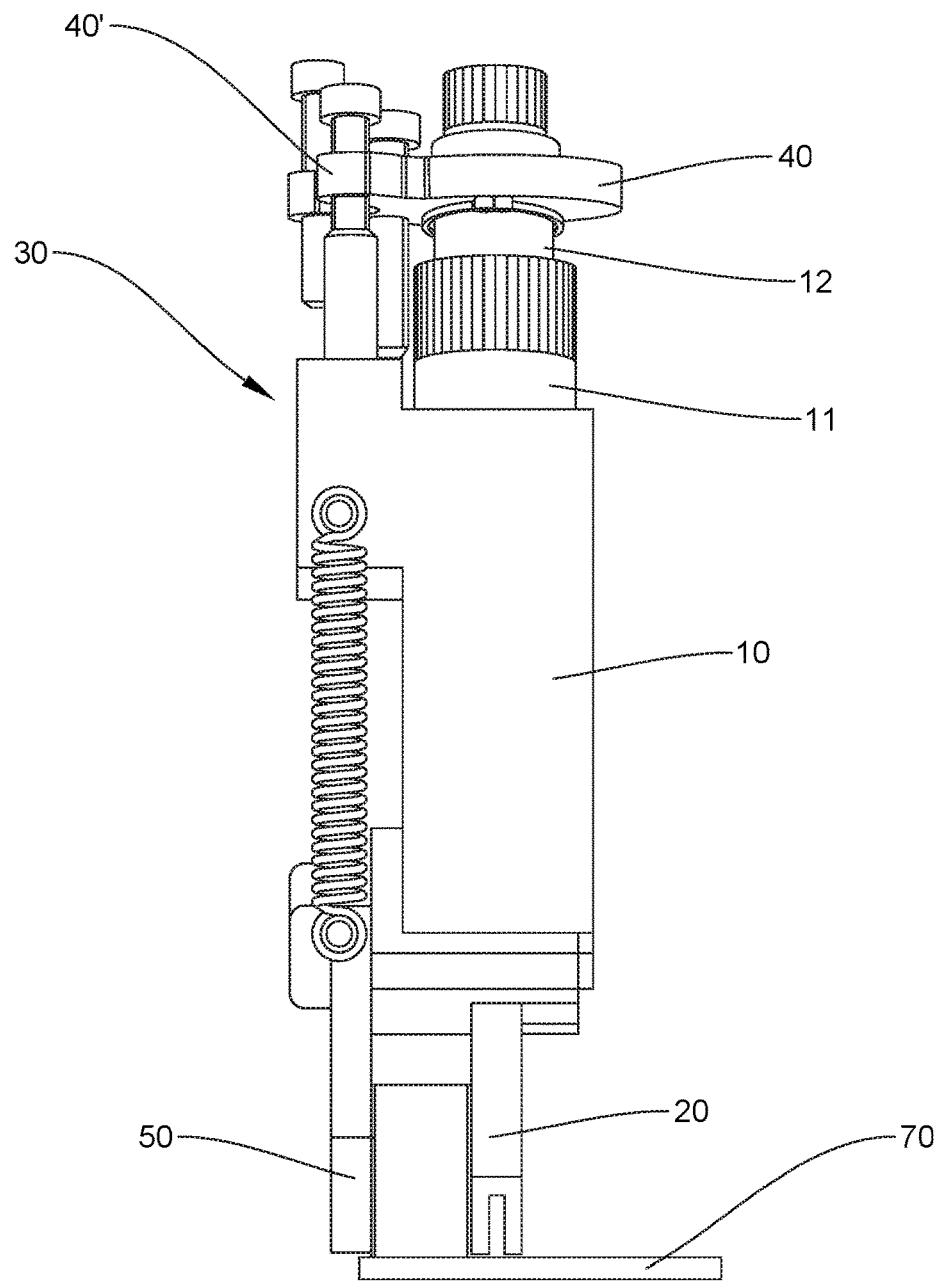

The main body, as shown also in the lateral view of FIG. 2, has generally a box-like shape, although, obviously, other forms could be realized without for this moving apart from the present inventive concept.

The roller 50 is connected to an L-shaped arm 34 fixed to the body 10 through a screw 52. The screw 52 serves as a rotatory pivot for said L-shaped arm 34, so that the roller 50 has in fact a lowering/lifting motion through a rotation of the arm 34 around the fulcrum 52.

Going on with the structural description of the invention, always FIG. 1 shows the lever 33 that results to be hinged by one of its ends to the arm 34 and by the opposite end to a last lever 32 (and therefore the lever 33 has a function of connecting rod).

The lever 33 is therefore interposed between the L-shaped lever 34 and the lever 32.

The lever 32 is bound to slide inside a guide formed by the block 31, generally integral to the body 10, inside of which a simple sliding channel is found.

Therefore, the hinged lever system (32, 33, 34) is such that through the sliding of the lever 32 into the block 31 the lever 33 is taken in roto-translation and from here the rotation to the lever 34 is transmitted that rotates around its fulcrum 52.

Going greatly into the descriptive detail of the lever 33 and of the lever system in general, it is shown very well always in FIG. 1 that such a lever 33 forms an appendix 33' on an end and an appendix 33" on the opposite end.

The appendices 33' and 33" emerge from the lever body 33 in a substantially orthogonal way to it and are a single body with the rest of the lever 33.

The function of such appendices is the following, as shown always in FIG. 1. In particular, the appendix 33" is arranged to go to the stop against an insert 31' emerging from the block 31, serving this as stop for the lever 33 and for the lever system in general. The opposed appendix 33' serves to fix to it an end of a return spring 60 whose opposite end is fixed to a fixed protuberance of the block 31. The protuberance of the block 31 can be obtained in various different ways, for example by creating a threaded hole in the block 31 and screwing a screw or an insert partially protruding from the hole and that serves precisely as anchorage for the end of the spring.

The spring 60, through the appendix 33' and as shown in FIG. 1, exerts such a return force (F) that the entire lever system is blocked in this position of stop with the appendix 33" in contrast against the insert 31' and therefore the whole in a completely lifted position. In fact, in this position of FIG. 1, the lever 32 is almost totally lifted towards the top and the only motion allowed would be that of a sliding towards the bottom with a consequent rotation of the roller 50 and of the lever 34 in clockwise direction, as shown in FIG. 1.

Figure 4:
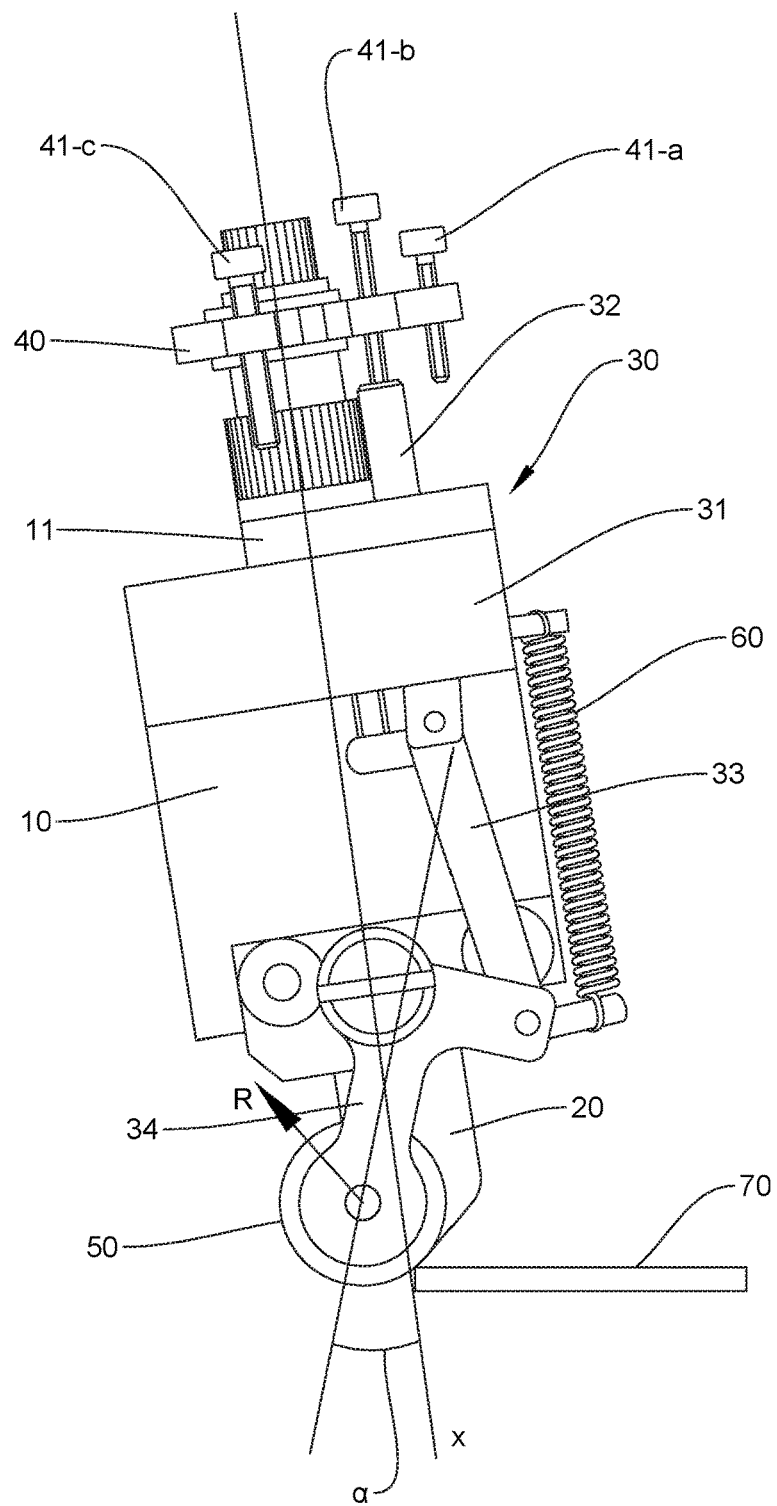
FIG. 4 highlights the angle of positioning of the lever (34)

It is to be noted that the size of the levers and their positioning is such that, in stop position as per FIG. 1, the L-shaped lever 34 is rotated of a certain angle .alpha. with respect to the longitudinal axis (X) of the device 1 (see FIG. 4). This makes that in whatever position the roller 50 is brought in contact with a surface to cut (through an approach of the device 1), a reactive force R is generated acting on the roller 50 that causes the rotation of the lever 34. This takes place also when the device 1 is exclusively pressed orthogonally on the surface to cut. Such a reaction R tends to make the lever 34 rotate in clockwise direction and therefore causing a sliding towards the bottom of the lever 32. In this condition the spring 60 lengthens further since the lowering of the lever 32 causes a roto-translation towards the bottom of the lever 33 and relative appendix 33'. The lengthened spring would tend to take back the lever system in the initial lifted configuration of stop, but this is impeded until the device is kept pressed on the surface 70 with a sufficient force as to contrast the return force of the spring 60. The rotation of the lever 34 initiates when the roller 50 intercepts the sharp edge of the plate, as per FIG. 4 or FIG. 1, and terminates when, starting from FIG. 4, for example, the roller climbs over such a sharp edge of the plate 70 to cut and initiates to roll on the surface with the device 1 kept with sufficient pressure on said surface while, contextually, it advances for the cut. At the end of the contact of the roller 50 with the surface 70, the spring 60 takes the lever system back in the configuration of FIG. 1 with the appendix 33" in contact with the insert 31' (stop).

Going on with the structural description of the invention, and with reference to FIG. 1 and FIG. 2, the body 10 holds slidingly inside it a rod 12 to whose summit is fixed a regulator screw (40, 41-c, 41-b, 41-a) and, on the opposite end, a support 20 on which the true cutting instrument (generally a diamond roller) is fixed.

The screw 40, as shown better in FIG. 2, is fixed to the end or in proximity of the end of the rod 12 and it is in the form of a ring having three extensions with eyelets 40', to each one of which is fixed a regulator screw (41-a, 41-b, 41-c).

Figure 3:
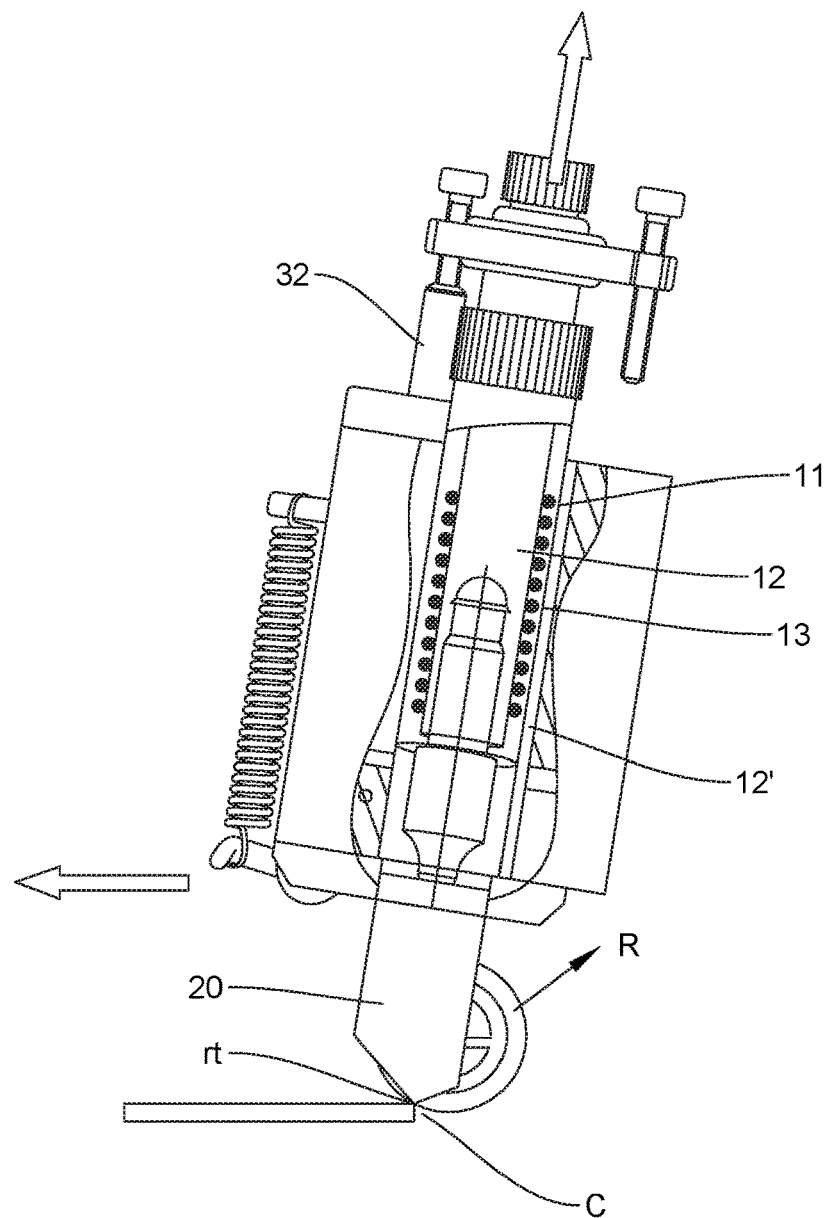

As well shown in the cutaway of FIG. 3, the rod 12 is therefore sliding into the body 10 through a cylindrical guide 11 into which it is placed slidingly, cylindrical guide that extends into the body 10 and that forms a lodging channel.

Always as shown in FIG. 3, the rod 12 forms a shoulder 12' to which the end of a return spring 13 is fixed. The other end of the return spring 13 is fixed to the fixed external cylinder 11. In that manner, as well shown always in FIG. 3, when a user lifts the rod 12, for example grasping such an axis by the end where the arrow of the example has been applied in proximity of the screws, it happens that the spring 13 compresses and, obviously, the blade holder support retracts towards the inside. When it is released, the rod 12 descends thanks to the action of push of the spring 13 until reaching a stop.

FIG. 1 shows well three regulator screws whose function will be described in detail below. It is clear that, as clarified below, the number of screws and their size can be any and not necessarily limited to the number of three as shown in the figures attached.

The rod 12 is further rotatable with respect to the cylinder 11 where it is lodged.

Each regulator screw is in fact a simple screw that is inserted in an eyelet 40' receiving one of the screws and that, according to how much it is screwed, it is positioned at a pre-defined height. It is well noted, in fact, in FIG. 1, that the regulator screw 41-c has its end lower with respect to the screw (41-b). This can be obtained either using screws of different lengths or the same screws that are screwed more or less in the respective eyelet that holds them.

The end of the rod 32 preferably forms a blind hollow, which terminates with a stop, and is suitable for holding the end of each regulator screw that thus penetrates in part inside the channel until it finds the stop.

At this point, what happens afterwards is clear. When none of the regulator screws is inserted in the channel of the rod 32, the rod 12, and therefore the relative blade holder 20, descend in totally lowered position due to the spring 13 that exerts a push force that makes the rod 12 slide downwards until it finds the relative stop (therefore position of the blade holder 20 totally extended with respect to the body 10). As said, with reference to FIG. 3, for example, the end of the rod 12 can be grasped with the fingers and it can be lifted against the force of the spring 13 (that thus goes in further compression) until one of the three regulator screws selected is inserted in the cavity of the rod 32, rotating contextually the rod 12 (FIG. 3 shows in fact a screw placed into the hollow of the rod 32). At this point, not only is the blade holder 20 kept lifted in a position determined by the height of the regulator screw, but, above all, its lowering motion is now kinematically connected and synchronized to the lever system motion (34, 33, 32).

It is to be noted that the spring 13 would tend to take back in extended position the blade holder, pressing also on the lever 32, but this is impeded by the lever system that thanks to the spring 60 exerts an opposed force. It is therefore enough to calibrate the springs in such a way that once the rod 12 is bound with a regulator screw to the lever system (in particular to the lever 32), the lever system—rod 12 are in equilibrium.

When, for example, with reference to FIG. 1 or FIG. 3 or 4, the roller 50 hits in its horizontal motion (advancement motion for cutting the device 1) against the edge of the plate 70, the reaction R causes such a rotation of the lever 34 (see FIG. 1) that the roller climbs over the edge of the plate 70 to be able then to slide on it. During such a rotation of the lever 34 for the climbing over, the lowering of the lever 32 contextually takes place that is dragged by the lever 33. The lever 32 slides in the guiding block 31 and, as a consequence, the rod 12 follows such a lowering movement thanks to the return spring 13 that exerts constantly a return force towards the bottom. The quantity of lowering of the blade holder 20 is however bound to the final position reached of the lever 34 at the end of the rotation, or when the roller 50 has climbed over the edge and starts to roll normally on the plane of the plate 70.

Basically, according to the thickness that is to be cut, one can choose such a regulator screw that the blade holder 20, and the relative blade, are lifted from the plane 70 when the roller enters in contact with the sharp edge of the plate 70. When the roller starts to climb over the edge, the lever 34 starts to rotate and, as a consequence, both the lever 32 and the rod 12 start to lower, progressively making the blade holder come closer to the plate 70. With the selection of the correct screws, for each thickness to cut it is possible to insure that the contact takes place when the climbing over has been almost completed and therefore downstream of the sharp edge or edge of the plate 70. The contact of the cutting blade, therefore, will take place when the blade is already in advanced position with respect to the sharp edge, avoiding that the blade hits violently against the sharp edge of the blade itself.

In use, therefore, the functioning is the following.

The device described in the attached figures is therefore fixed to a support as per FIG. 1A.

Once the screw of the thickness of the plate to cut has been chosen, it will be enough to make the device 1 slide until it hits against the sharp edge of the glass to then continue its cutting trajectory for all the length of the glass.

The rod 12 is therefore lifted and rotated in such a way as to take the selected screw into the cavity of the rod 32. In this position, therefore, the blade holder lifts as a consequence and remains lifted because physically bound to the rod 32.

From what has been said above, during the advancement of the roller, the sharp edge will be hit by the roller (or feeler element in general), while the blade becomes lifted on the surface of the plate and therefore not in contact with such a sharp edge. FIG. 3 in fact shows the initial condition in which the roller hits the sharp edge and starts to rotate and, in this configuration, it can be seen in the figure that the cutting roller (rt) slightly touches the surface without damaging it. During the advancement of the roller 50 the climbing over of the sharp edge takes place with a progressive rotation of the lever system and a consequent translation of the rod 32 towards the bottom. This causes a progressive lowering of the blade holder 20 until taking the blade (rt) in contact with the glass plate that will be cut only when such a blade (rt) will be downstream of the sharp edge (therefore, in advanced position).

The blade, therefore, does not hit against the sharp edge but penetrates directly on the surface.

In fact, the cut will go through all the length of the glass plate, except for the infinitesimal initial and final portion in which there has been no cut because there has been no contact with the blade. There is no contact, in fact, either at the beginning during the climbing over, or at the end of the cut, when the roller 50 descends from the plate, since in this case the lever system, thanks to the spring 60, rotates in initial position, causing also the lifting of the blade holder 20.

The two whole infinitesimal edges are not, obviously, a problem for the separation of the plate, which can be broken into two parts with extreme ease and precision once the cut has been finished.

The subsequent figures from 5 to 7 show three plates of different thickness, although plates of any thickness could be in theory cut with the correct screw.

Figure 5:
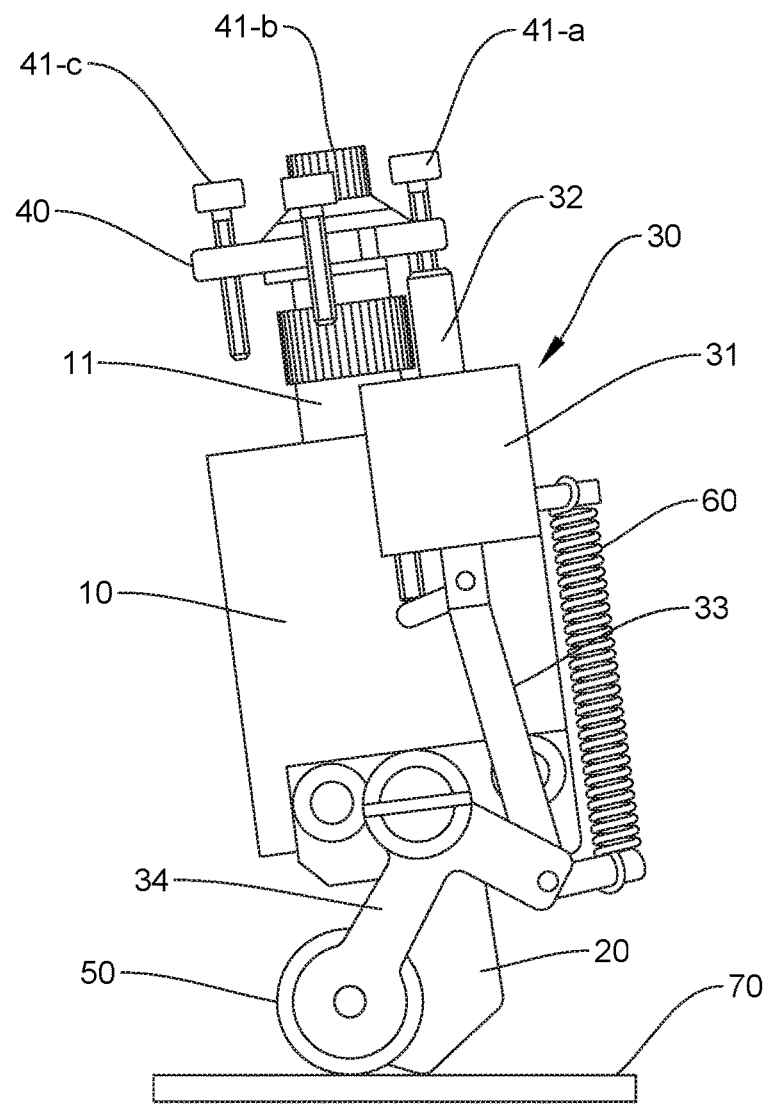
FIGS. 5 to 7 show an example of cut of glass plate of various thickness.

FIG. 5 shows, for example, the device 1 that advances for the cut along a plate of a thickness of 2 mm.

Figure 6:
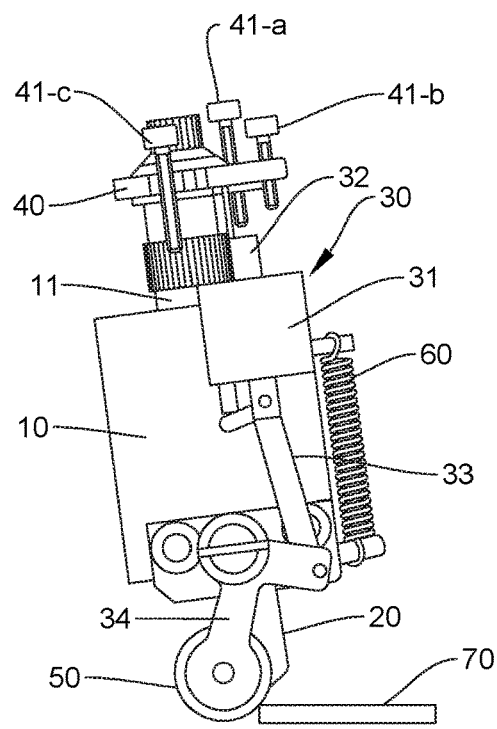
Figure 6:
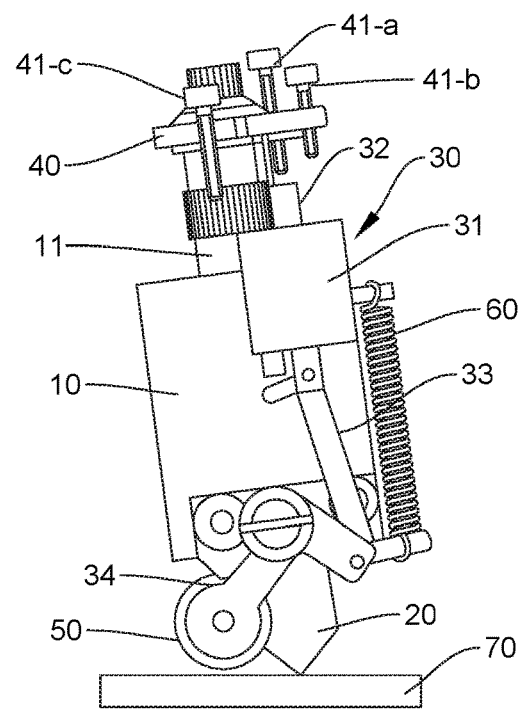

FIG. 6 shows in succession a climbing over and advancement to out a thicker plate, for example of 3 mm.

Figure 7:
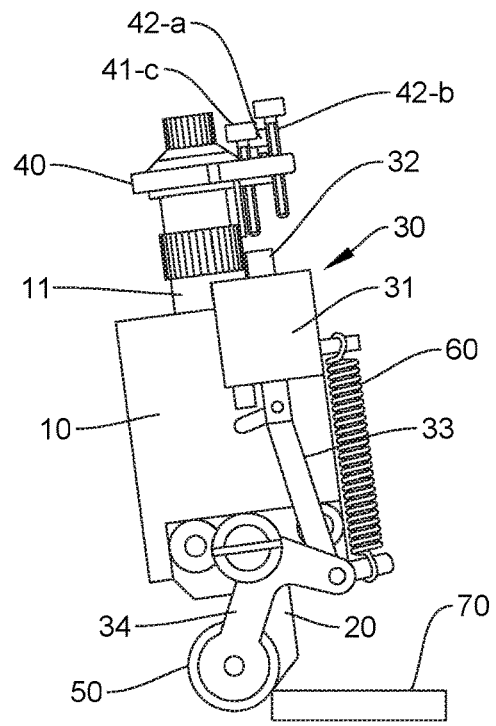
Figure 7:
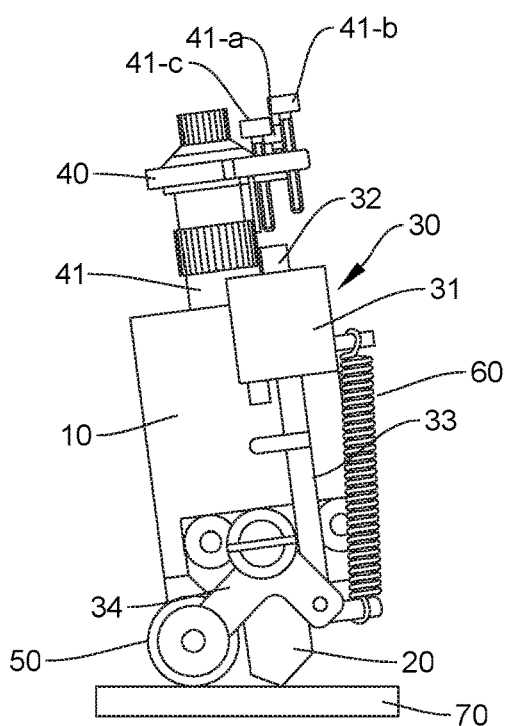

FIG. 7 shows a climbing over and advancement for a plate of 5 mm.

Even though the invention is preferably addressed to the cutting of glass plates, it can anyway be used in the same way for cutting surfaces in other materials such as cardboard or plastified material.

The invention claimed is:

1. A device for cutting a plate of a pre-determined thickness comprising:
   a frame;
   a support device supporting a cutting utensil, the support device being connected to the frame;
   said support device being adapted to have an upward and a downward motion with respect to the frame; and
   a hinged lever system having a feeler element, said hinged lever system being kinematically coupable with said support device to bind said support device in a pre-determined initial position with respect to the frame and so that, when said feeler element is pressed against an edge of the plate, an operation of the hinged lever system is caused allowing the support device, starting from said initial position, to move downward and the cutting utensil to approach the plate;
   wherein the frame comprises a body and the support device comprises a rod that is slidingly inserted in the body,
   a regulator device being fixed at one end of the rod and the support device being coupled to an opposite end of the rod,
   the regulator device comprising at least one regulator screw, each regulator screw being inserted in a respective receiving eyelet so that the regulator screw is positionable at a pre-defined height,
   the lever system comprising a L-shaped first lever rotatably engaged to the frame, a third lever assembled slidingly into a guide, and a second lever hinged by its ends respectively to the first lever and to the third lever such that a rotation of the first lever in a clockwise or in a counter-clockwise direction causes, via the second lever, an upward or downward translation of the third lever along the guide, further comprising:
a first elastic member acting on the second lever to keep said hinged lever system in a starting position and, when a rotation of the first lever against an action of said first elastic member is caused by the operation of the hinged lever system, said rotation causes a downward translation of the third lever, said first elastic member exerting a returning force to move the hinged lever system toward the starting position; and
a second elastic member acting on the rod to exert a force on the rod causing the rod to move toward an extraction direction, the first and second elastic members being calibrated so that, when the regulator screw rests on a head of the third lever, the rod and the third lever are in equilibrium and so that when the rotation of the first lever, causing the downward translation of the third lever, is applied, the translation of the third lever causes a downward movement of the rod, and when a counter-rotation of the first lever caused by the first elastic member is applied, said counter-rotation of the first lever causes an upward movement of the third lever that pushes the rod via the regulator screw upward against operation of the second elastic member.

2. The device as per claim 1, wherein three are three regulator screws, each of the regulator screws being shaped as an elongated element, the three regulator screws having different lengths.

3. The device as per claim 1, wherein the third lever comprises a blind channel receiving each connection element in part.

4. The device as per claim 1, wherein the feeler element is shaped as a roller.

5. The device as per claim 4, wherein said roller is rotatably bound to a free end of the rod.

6. The device as per claim 1, wherein the rod is rotatable around a longitudinal axis of a site, into which the rod is slidingly inserted.

* * * * *